Nov. 8, 1932. L. J. DORNHOFER 1,886,534
STEAM AND WATER MIXER
Filed Aug. 17, 1929 2 Sheets-Sheet 1

INVENTOR
Louis J. Dornhofer
BY
Gustav R. Thompson
ATTORNEY

Nov. 8, 1932.   L. J. DORNHOFER   1,886,534
STEAM AND WATER MIXER
Filed Aug. 17, 1929   2 Sheets-Sheet 2
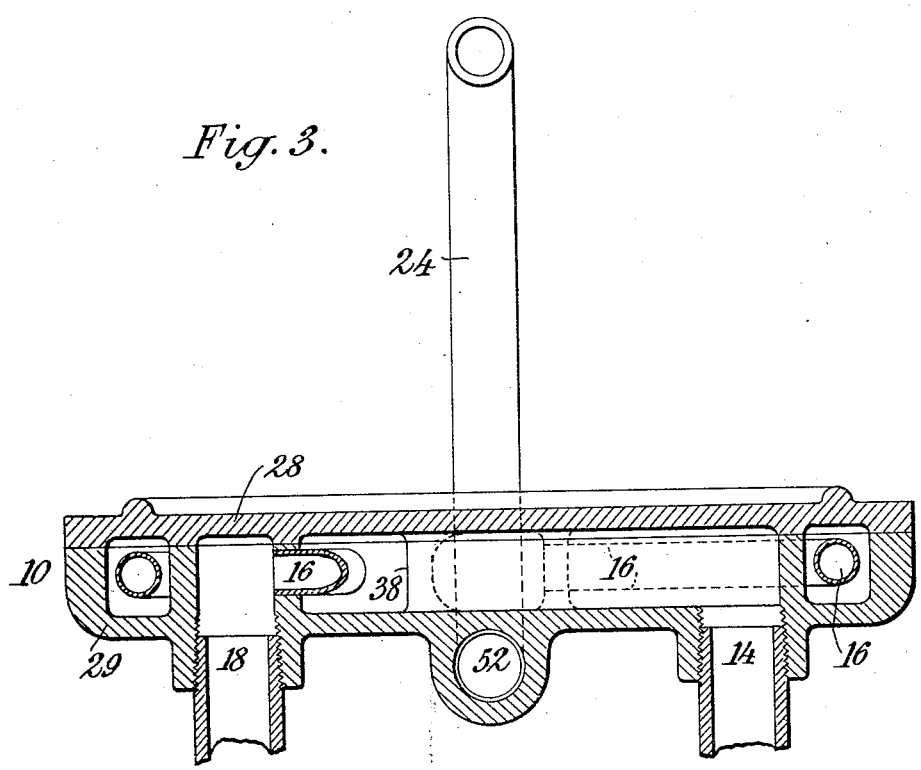
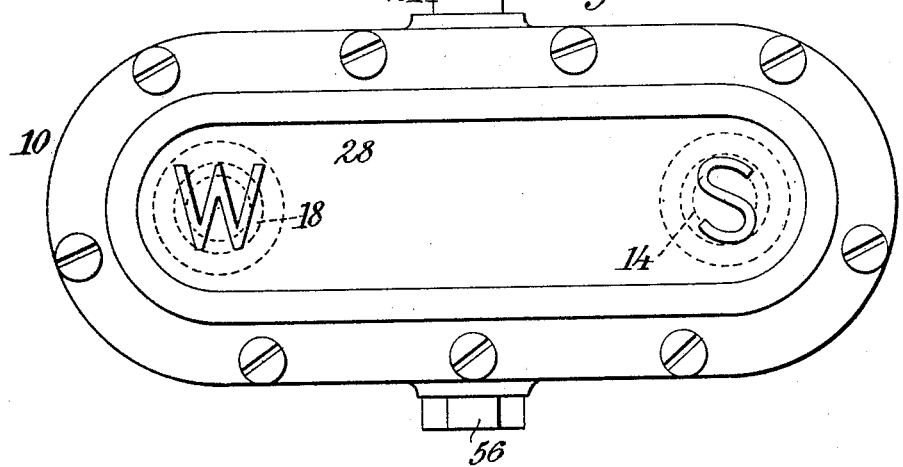

Patented Nov. 8, 1932

1,886,534

UNITED STATES PATENT OFFICE

LOUIS J. DORNHOFER, OF LEONIA, NEW JERSEY, ASSIGNOR OF ONE-HALF TO HAROLD A. FALES, OF LEONIA, NEW JERSEY

STEAM AND WATER MIXER

Application filed August 17, 1929. Serial No. 386,501.

This invention relates to a device adapted to be attached to a steam and a water pipe for mixing steam and water and absorbing the steam in the water to produce a jet or stream of hot water, and aims to provide improvements therein.

The invention provides a device of the character referred to which operates without a water-hammer or noise, which provides a steady stream or jet which may issue from a spout without spurting, surging or spraying, which provides for water heated to any desired degree up to very nearly the temperature of boiling water, and which provides for a steady supply of heated water at very nearly constant temperature, and which when heated water is not desired may be used for supplying cold water.

The invention further provides a device of the character described of simple and compact construction, which may be readily and economically manufactured, and which may be readily and unobtrusively attached over a sink.

The invention is especially adaptable for use in chemical laboratories, and industrial plants where there is no supply of hot water.

An embodiment of the invention is illustrated in the accompanying drawings, wherein Fig. 1 is a front elevation of the device shown as applied to a sink such as used in chemical laboratories.

Fig. 3 is a horizontal cross-section on the line III—III Fig. 2.

Fig. 5 is a front elevation.

Figure 1:
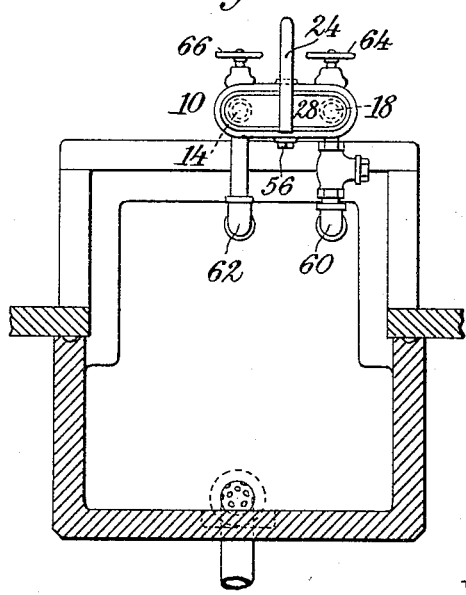
Figure 4:
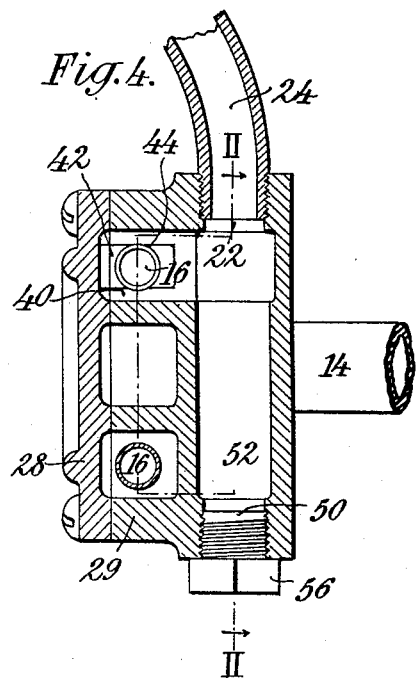
Fig. 4 is a vertical section on line IV—IV Fig. 2.
Figure 2:
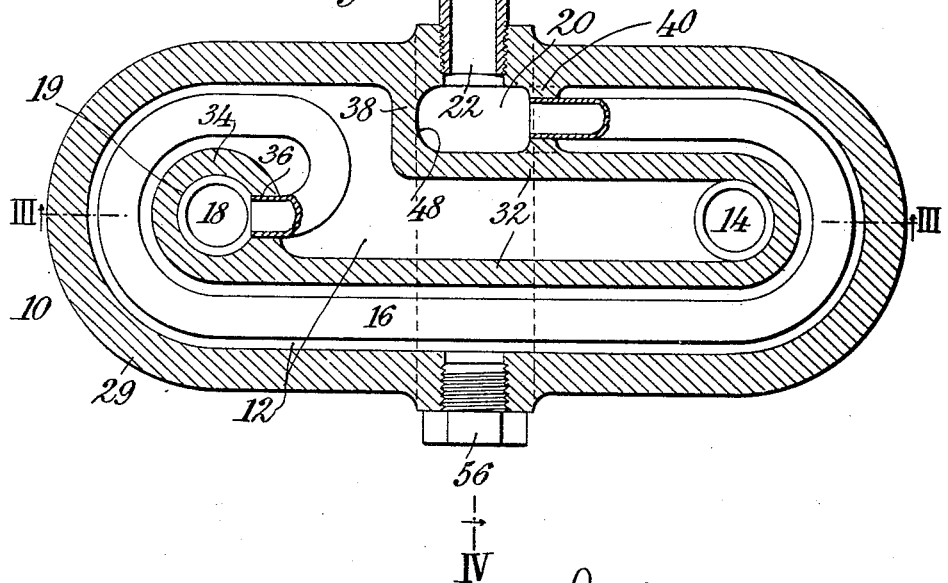
Fig. 2 is a longitudinal section of said embodiment on line II—II Fig. 4.

Referring to said drawings, numeral 10 designates a box or housing having therein a steam channel 12, 14 a steam inlet to said channel, 16 a water pipe (thin wall copper tubing) within said steam channel 12, 18 a water inlet, preferably formed with a water-admission chamber 19 with which said water-pipe 16 communicates, and 20 a "mixing" chamber with which both said water pipe 16 and steam channel 12 communicate at their discharge ends and in which steam is absorbed or condensed by the water. For brevity, the chamber 20 will be referred to merely as a mixing chamber. 22 indicates a discharge passage communicating with said mixing chamber 20 and through which the stream of heated water passes off from said mixing chamber; a spout or nozzle 24 is usually attached to or formed as a part of said discharge passage 24.

Said box or housing 10 is preferably formed as a relatively narrow or thin box, and is preferably formed in two parts 28—29 one of which is in the form of a lid 28. The box part 29 is preferably formed as a one-piece casting with a rib 32 having a flattened volute form, and forming between said rib and an adjacent part and between the same and the walls of the box part 29, the aforesaid steam channel 12.

At one end of the rib 32 adjacent to the first turn of the volute is formed a hollow projection 34 forming the water admission chamber 19. The hollow projection 34 is provided with an opening 36, in which is fitted and also preferably soldered the receiving end of said water pipe 16, and the water inlet 18 is preferably drilled through the bottom of said box part 29 concentrically with said hollow projection 34.

The steam inlet is also preferably drilled through the bottom of said box part 29, opening into said volute channel 12 preferably at the initial part of said channel, and the flattened form of said volute has the advantage of spacing the water and steam inlets sufficiently apart to admit of convenient pipe-fitting being done in connecting the device to the steam and water pipes.

The mixing chamber 20 is preferably in the form of a hollow projection 38 at the discharge end of said channel 12. 40 designates a wall between the end of channel 12 and the mixing chamber and an opening for receiving the discharge end of water pipe 16, and also for admitting steam from the end of channel 12, is conveniently provided by a slot 42. Rounded portions 44 are conveniently provided for receiving and holding the end of pipe 16, and the openings in the slot 42 on each side of the pipe provide the steam passages into the mixing chamber.

The wall 48 of the mixing chamber 20 opposite the water and steam inlets is preferably concave or rounded somewhat spherically, as this form has ben found by practical experience to contribute materially to the steady issuance of the jet or stream from the device.

The heated water may flow off in a single direction through the passage 22, so as to run off from the top of the device when attached as here shown, or if desired, an outlet passage 50 may be provided at the opposite side, the passages 22 and 50 being connected by a passage 52 running across the bottom or back of the box-part 29 as shown. A plug 56 may close one of the outlet passages 22, 50 which is not to be used.

The location of the outlet passage 22 (or 22 and 50) at 90° to the water and steam inlet passages 18 and 14 contributes to the ease of making the connections and to the unobtrusiveness of the device when in place.

The outlet opening 36 from the water admission chamber 19 and the opening 42 through which water discharges from the pipe 16 into the mixing chamber 20 both preferably face in the same direction, and the inlet and outlet ends of the pipe 16 are also preferably bent so as to face in the same direction whereby the ends of the pipe 16 may be forced into the said openings 36 and 42 by displacing the pipe 16 as a whole in the channel 12 and then forcing both ends in the same direction into said openings 36 and 42.

The cover part 28 tightly closes the box when fastened, and when unfastened provides easy and full access to all parts within the box.

The device is relatively small and compact and is thin, and is readily applied over a sink for example without causing materially more obstruction or encumbrance than the spigots or valves which are ordinarily used over sinks.

Steam and water pipes 60, 62 are connected to the steam inlet 14 and water inlet 18 respectively and valves 64, 66, serve to regulate the flow of steam and water through these pipes to the device.

To obtain heated water the valve 66 in the water pipe is first opened to admit water into the mixing chamber, from whence it flows through the nozzle 24. After the water valve 66 has been opened, steam is then admitted by opening the steam valve 64. Steam then enters the channel 12 through said inlet, preheats the water in pipe 16 and then discharges into the mixing chamber through the openings 42, and mixes with the water in the mixing chamber 20, and heated water flows off through the nozzle 24.

Any water which gets into the channel 12 is pushed out or entrained by the steam, and passes out of the channel into the mixing chamber through the openings 42. The amount of water initially admitted should be sufficient to provide a steady stream through the nozzle 24. The degree of heating of the water is obtained by admitting more or less steam, and of course the water valve may be opened wider than just sufficient to provide a steady stream through the nozzle 24, to increase the velocity of the stream.

By proper regulation of the water and steam valves steady streams of water through a range of velocities and heated throughout the range from cold water to very nearly the boiling temperature may be obtained without spraying, spurting, or bursting of the stream. It has been ascertained that a steady stream of water heated to 98° centigrade may be obtained. Furthermore the device operates without "hammering" or "knocking".

From the foregoing it will be seen that there is provided by the present invention a device which operates without hammer or similar noise and provides a steady stream of hot water through a wide range of temperatures and which at the same time is a very simple construction, readily manufactured and easily accessible, readily installed, small and compact and unobtrusive in its installed position.

The invention may receive various other embodiments than those herein specifically illustrated and described.

What is claimed is:—

1. A steam and water mixer for supplying a jet of heated water, comprising a mixing chamber, a steam channel opening into said mixing chamber, and a water pipe within said steam channel and also opening into said mixing chamber, the water in said pipe being preheated by said steam before entering said mixing chamber, and an outlet from said mixing chamber through which a stream of heated water passes, said mixer having a water receiving chamber, said water chamber and mixing chamber having openings for said water pipe facing in the same direction, said water pipe having its ends turned in the same direction and thereby adapted to be entered into said openings from one direction.

2. A steam and water mixer for supplying a jet of heated water, comprising a mixing chamber, a steam channel opening into said mixing chamber, and a water pipe within said steam channel and also opening into said mixing chamber, the water in said pipe being preheated by said steam before entering said mixing chamber, and an outlet from said mixing chamber through which a stream of heated water passes, said channel having a flattened volute form, a steam inlet to the initial part of said volute, and a water inlet adjacent to the first turn in said flattened volute.

3. A steam and water mixer for supplying a jet of heated water, comprising a relatively narrow or thin box provided with a removable part or cover, said box having a mixing chamber and a volute channel leading to said mixing chamber, an opening into said channel for admitting steam thereto, a water chamber, and an opening into said water chamber for admitting water thereto, and a pipe connected with said water chamber and running through said channel to said mixing chamber, and arranged to discharge therein, and a discharge passage for conveying water heated in said mixing chamber to an outlet.

4. A steam and water mixer for supplying a jet of heated water, comprising a relatively narrow or thin box provided with a removable part or cover, said box having a mixing chamber and a volute channel leading to said mixing chamber, an opening into said channel for admitting steam thereto, a water chamber, and an opening into said water chamber for admitting water thereto, and a pipe connected with said water chamber and running through said channel to said mixing chamber, and arranged to discharge therein, and a discharge passage for conveying water heated in said mixing chamber to an outlet and a second outlet from said mixing chamber, said box having a channel connecting said mixing chamber and second outlet.

5. A device according to claim 3 further including means for admitting water to said mixing chamber prior to admitting steam thereto.

6. A device according to claim 3, wherein said steam and water admission openings are in the back of said box.

7. A steam and water mixer for supplying a steady free-flowing jet of heated water, a steam channel, a water pipe, and a chamber for mixing and absorbing steam in the water, said steam channel and water pipe both opening into said mixing chamber, said water pipe being closed against passage of steam therethrough, said water pipe being within said steam channel and being heated externally by the steam throughout substantially the entire length thereof prior to reaching said mixing chamber, the water in said pipe being pre-heated by said steam before entering said mixing chamber, and an outlet from said mixing chamber leading to the atmosphere through which a steady stream of heated water passes, said steam channel being constricted immediately at its outlet into said mixing chamber, the axis of said outlet from said mixing chamber being substantially at right angles to the axis of the stream flow into said mixing chamber.

8. A steam and water mixer according to claim 7 wherein said mixing chamber has a concave wall opposite the outlet of said water pipe into said chamber.

In witness whereof, I have hereunto signed my name.

LOUIS J. DORNHOFER.